(12) United States Patent
Bendt

(10) Patent No.: US 10,470,952 B2
(45) Date of Patent: Nov. 12, 2019

(54) CHASSIS FOR VEHICLE

(71) Applicant: Bendt IPR ApS, Aarhus C (DK)

(72) Inventor: Mads Bendt, Tranbjerg J (DK)

(73) Assignee: Bendt IPR ApS, Aarhus C (DK)

( * ) Notice: Subject to any disclaimer, the term of this patent is extended or adjusted under 35 U.S.C. 154(b) by 28 days.

(21) Appl. No.: 15/320,833

(22) PCT Filed: Jun. 17, 2015

(86) PCT No.: PCT/DK2015/050172
§ 371 (c)(1),
(2) Date: Dec. 21, 2016

(87) PCT Pub. No.: WO2015/197069
PCT Pub. Date: Dec. 30, 2015

(65) Prior Publication Data
US 2017/0156951 A1 Jun. 8, 2017

(30) Foreign Application Priority Data

Jun. 24, 2014 (DK) .................... 2014 00332

(51) Int. Cl.
*A61G 5/04* (2013.01)
*A61G 5/06* (2006.01)
(Continued)

(52) U.S. Cl.
CPC .......... *A61G 5/04* (2013.01); *A61G 5/06* (2013.01); *A61G 5/10* (2013.01); *A61G 5/1051* (2016.11);
(Continued)

(58) Field of Classification Search
CPC .......... B62D 61/04; B62D 61/02; A61G 5/04; B60K 1/04; B60K 7/0007; B60K 2007/0038
(Continued)

(56) References Cited

U.S. PATENT DOCUMENTS 1,262,806 A * 4/1918 Kemble .................. B62M 6/60
180/206.5
1,426,975 A * 8/1922 Fuscaldo ................ B62D 61/04
180/21
(Continued)

FOREIGN PATENT DOCUMENTS

CN  2277759 Y  4/1998
CN  2571350 Y  9/2003
(Continued)

*Primary Examiner* — Jacob D Knutson
(74) *Attorney, Agent, or Firm* — Dinsmore & Shohl LLP

(57) ABSTRACT

The present invention relates to a chassis for vehicle, comprising: a rigid frame, a pair of side wheels in a parallel configuration, a steerable front wheel, a steerable rear wheel, at least one electric motor, wherein at least one of said front wheel or rear wheel is connected to and driven by the at least one electric motor, and wherein said front and rear wheels are mutually connected through a turning mechanism arranged to turn said front and rear wheels simultaneously and synchronously between a middle position in which the axles of the front and rear wheels are substantially parallel with the axles of side wheels, and left or right positions, in which the axles of the front and rear wheels are substantially perpendicular to the axles of the side wheels.

21 Claims, 3 Drawing Sheets

(51) Int. Cl.
    *A61G 5/10*    (2006.01)
    *B60K 1/02*    (2006.01)
    *B60K 7/00*    (2006.01)

(52) U.S. Cl.
    CPC .............. *A61G 5/1089* (2016.11); *B60K 1/02* (2013.01); *B60K 7/0007* (2013.01); *B60K 2007/0038* (2013.01); *Y02T 10/7258* (2013.01)

(58) Field of Classification Search
    USPC ........................................................ 180/209
    See application file for complete search history.

(56) References Cited

U.S. PATENT DOCUMENTS

| | | | | |
|---|---|---|---|---|
| 2,067,546 | A * | 1/1937 | Rocher | B62D 61/04 180/21 |
| 2,076,722 | A * | 4/1937 | Heinze | B62D 61/04 180/21 |
| 2,548,749 | A * | 4/1951 | Stout | B62D 61/04 280/259 |
| 2,592,893 | A * | 4/1952 | Hansen | B60G 3/01 180/21 |
| 3,709,313 | A * | 1/1973 | James | A63H 11/10 180/21 |
| 4,775,021 | A * | 10/1988 | Marino | B62D 61/00 180/21 |
| 5,435,404 | A * | 7/1995 | Garin, III | A61G 5/043 180/6.5 |
| 5,623,818 | A | 4/1997 | Ledbetter | |
| 5,904,218 | A * | 5/1999 | Watkins | B62D 61/02 180/209 |
| 8,091,658 | B2 | 1/2012 | Peng | |
| 2007/0144799 | A1* | 6/2007 | Vasant | B60K 1/04 180/65.1 |
| 2007/0151777 | A1* | 7/2007 | Peng | B62D 61/02 180/21 |
| 2010/0181135 | A1* | 7/2010 | Sbarro | B60K 6/52 180/253 |
| 2014/0217714 | A1* | 8/2014 | Sekiya | B62D 21/04 280/781 |
| 2014/0224556 | A1 | 8/2014 | Mroz | |

FOREIGN PATENT DOCUMENTS

| | | | |
|---|---|---|---|
| CN | 2857927 Y | 1/2007 | |
| DE | 3708118 A1 * | 9/1988 | ............ B62D 9/00 |
| EP | 0300185 A2 | 1/1989 | |
| GB | 1270975 * | 4/1972 | |
| JP | 2009226070 A | 10/2009 | |
| NL | 9101209 A | 2/1993 | |
| RU | 2494908 C2 | 10/2013 | |
| WO | 2004047709 A1 | 6/2004 | |
| WO | WO-2005021360 A1 * | 3/2005 | ............ B65D 7/026 |

* cited by examiner

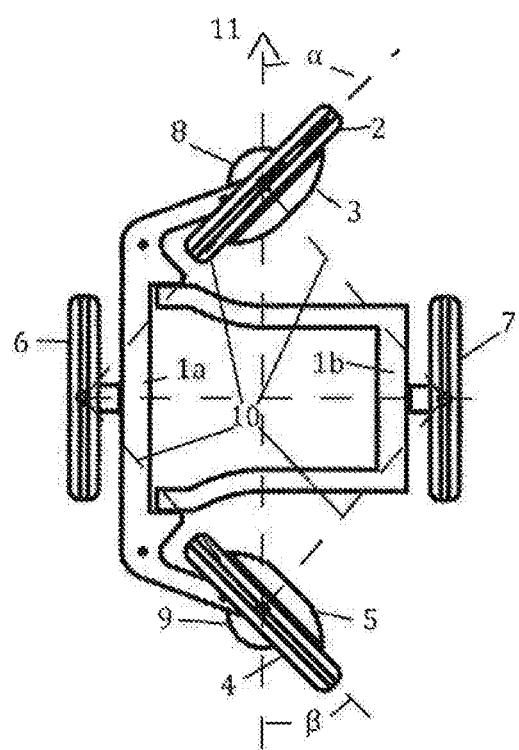
Figur 3
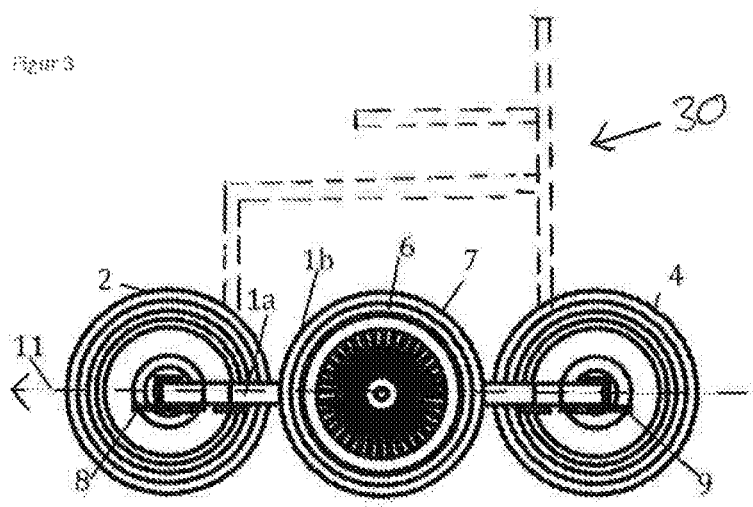
Figur 4

CHASSIS FOR VEHICLE

FIELD OF INVENTION

The invention relates to a chassis for vehicle having a steerable front wheel and a steerable rear wheel. The invention further relates to a vehicle, such as a wheelchair, comprising the chassis.

BACKGROUND OF INVENTION

Since the beginning of the development of driving frames for electrically driven vehicles, it has been a known problem to ensure 1) adequately long possible driving distance; 2) adequately large manoeuvrability; 3) adequately low weight; 4) adequately minimum appearance; 5) adequately minimum complexity; and 6) adequate capacity to overcome obstacles. These problems have not been seen to have been solved in one invention.

A chassis constitutes a structural part or parts of an electrically driven wheelchair. Wheelchairs are often used in buildings, means of transportation and other places where there may be a limited turning space, but also outdoors where there are requirements to be able to overcome obstacles in the form of kerbstones and the like, and to drive uphill and downhill and along cross-sloping surfaces. Preferably, the wheelchair should, after an overnight recharging, work an entire day without any need for further recharging of the electrically driven wheelchair. Such electrically driven wheelchairs are today very similar within their structural groupings and may generally be divided into three different subgroups with respect to their steering: 1) Electrically driven wheelchair designed for indoor and outdoor use, normally consisting of a chassis on which two electrically driven, not steerable wheels are mounted in parallel, the steering controlled by varying the rotation speed of the individual wheels individually, and a number of supporting wheels following the direction. 2) Electrically driven wheelchair primarily designed for outdoor use and normally consisting of a chassis on which two electrically driven wheels are mounted in parallel, and one or two further supporting and steering wheels. 3) Electrically driven wheelchair primarily designed for indoor use and normally consisting of a chassis on which two or four electrically driven steering wheels are mounted.

The first subgroup can be considered a relatively simple solution, which exists in several versions. The two parallel, not steerable wheels may be configured at the front part of the chassis, the centre part of the chassis or the rear part of the chassis, supported by a number of supporting wheels, and are all associated with a number of disadvantages. They have relatively large turning radius, and the fact that they turn by regulating rotation speed of the two parallel wheels individually makes them energy inefficient since turning implies that the rotation speed of one or both of the wheels is changed. As a consequence, larger batteries are needed, which makes the wheelchair difficult to manoeuvre. The abovementioned three versions of the first category also have their own disadvantages. For example, the chassis having the two parallel, not steerable wheels placed at the rear part of the chassis may have problems driving down sloping surfaces, and the front wheels may have problems of getting stuck in loose surfaces because of surface pressure from size and weight distribution. If the two parallel, not steerable wheels are instead placed at the front part of the chassis, there is a risk of the wheelchair tilting forward when driving downwards on sloping surfaces or having problems when driving upwards on sloping surfaces.

The second subgroup includes chassis on which two electrically driven wheels are mounted in parallel, usually at the rear part of the chassis, and one or two steerable wheels at the front part of the chassis. Typically, the steerable front wheel is mechanically coupled to handlebars like on a moped, a steering rod or by means of a joystick which, by means of a control and steering system, controls a linear actuator that mechanically turns the wheels. These chassis are typically directionally stable. A known disadvantage with this chassis is the large turning radius due to the driving force in a forward direction of the vehicle, i.e. the rear wheel do not propel in the direction of the steering wheel. A further disadvantage is that if the front wheel would be turned 90° in relation to the rear wheel, the wheelchair would not drive and would risk tipping over.

The third category includes chassis on which two or four electrically driven steering wheels are mounted. In some cases the wheels may be rotated around a vertical axis mounted above the wheel. These chassis are characterized by a poor ability to climb differences in level, and increased installation height because of the rotary shaft above the driving wheel for steering, typically resulting in smaller wheels as a trade-off.

JP2009226070 describes a rear wheel driven electrically driven wheelchair in which the front wheels are free-running but steered.

EP0300185 describes a front wheel driven electrically driven wheelchair in which the rear wheels are free-running but steered.

U.S. Pat. No. 5,623,818 describes a four-wheel vehicle consisting of a front wheel set and a rear wheel set and in which the vehicle have two steering modes: the first steering mode is during normal driving where the front pair of wheels are steering wheels and the rear pair of wheels are fixed and parallel, and steering thus takes place like for a normal automobile; the second steering mode is during manoeuvring about its own axis where there is steering on both the front and the rear pair of wheels.

The abovementioned solutions seek to solve various problems concerning chassis for vehicles, but they all have problems with regard to the combination of the following aspects: driving distance, manoeuvrability, weight, size, steering complexity, and ability to climb obstacles.

SUMMARY OF INVENTION

The present invention provides a chassis for vehicle with improvements related to driving distance, manoeuvrability, weight, volume, complexity, and ability to climb obstacles.

The presently disclosed invention relates to a chassis for vehicle, comprising: a rigid frame, a pair of side wheels in a parallel configuration, a steerable front wheel, a steerable rear wheel, at least one electric motor, wherein at least one of said front wheel or rear wheel is connected to and driven by the at least one electric motor, the chassis characterized in that said front and rear wheels are mutually connected through a turning mechanism arranged to turn said front and rear wheels simultaneously and synchronously between: a middle position in which the axles of the front and rear wheels are substantially parallel with the axles of the side wheels, and left or right end positions, in which the axles of the front and rear wheels are substantially perpendicular to the axles of the side wheels. In this configuration the energy that the motor(s) has/have to supply is only applied to propulsion directly in the moving direction. This is a more energy efficient solution, which means that a vehicle mounted on the chassis can be transported a longer distance on the same battery compared to a conventional chassis. The fact that the front and rear wheels are connected through a turning mechanism arranged to turn said front and rear wheels simultaneously and synchronously makes the design simple and efficient compared to having individually controlled steering mechanisms for the front wheel and rear wheel. If the front and rear wheels are positioned with the same distance from the axis of the parallel side wheels, it means that the wheels have the same turning angles (but opposite) when turning, which is beneficial for the simplicity of the steering construction, and also implies that the front and rear wheels will have the same rotation speed. An additional advantage of the presently disclosed chassis in relation to a solution where the parallel side wheels provide the propulsion is that the front and rear wheel may be positioned 90° in relation to the parallel side wheels, which provides for a smaller turning radius.

Further advantages of the presently disclosed inventions relate to at least one of the side wheels being tiltable relative to a horizontal plane, which improves the ability to climb obstacles when driving. In one embodiment the rigid frame comprises two parts connected to each other in a substantially horizontal plane. In such a solution one part may be arranged in a substantially longitudinal direction of the chassis and connected to the front wheel, rear wheel and one of the side wheel, whereas the other part is connected to the other side wheel. The second part may be vertically tiltable in relation to the first part, thereby allowing improved ability to climb obstacles. Furthermore, if all parts of the chassis are arranged in substantially one horizontal plane, the height of the chassis is only as high as the diameter of the wheels.

In one embodiment the rear wheel is connected to and driven by a primary electric motor. In another embodiment of the invention the rear wheel is connected to and driven by a primary electric motor and the front wheel is connected to and driven by a secondary electric motor. By having the electric motor(s) for each wheel can be seen as a means to further simplify the design and avoid additional wiring.

DESCRIPTION OF DRAWINGS

The invention will in the following be described in greater detail with reference to the drawings. The drawings are exemplary and are intended to illustrate some of the features of the present method and unit and are not to be construed as limiting to the presently disclosed invention.

FIG. 5 shows an embodiment of a chassis according to the invention, seen from behind, the chassis driving on an even surface.

FIG. 6 shows an embodiment of a driving frame according to the invention, seen from behind, the chassis driving, wherein the right side wheel is climbing an obstacle.

DETAILED DESCRIPTION

Figure 1:
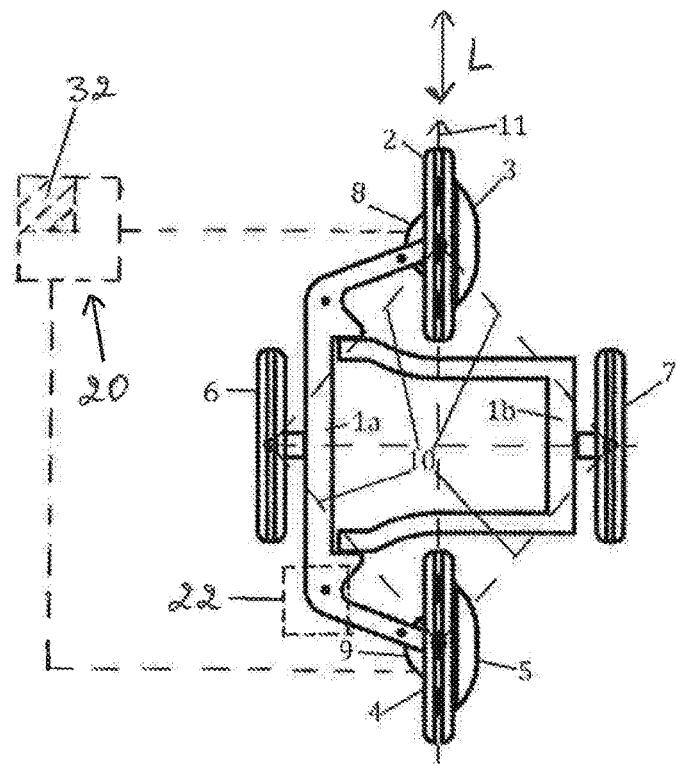
FIG. 1 shows an embodiment of a chassis according to the invention, seen from above, with the wheels in a forward position.

The presently disclosed invention relates to a chassis for vehicle, comprising: a rigid frame, a pair of side wheels in a parallel configuration, a steerable front wheel, a steerable rear wheel, at least one electric motor, wherein at least one of said front wheel or rear wheel is connected to and driven by the at least one electric motor, the chassis characterized in that said front and rear wheels are mutually connected through a turning mechanism arranged to turn said front and rear wheels simultaneously and synchronously between: a middle position in which the axles of the front and rear wheels are substantially parallel with the axles of the side wheels, and left or right end positions, in which the axles of the front and rear wheels are substantially perpendicular to the axles of the side wheels.

The rigid frame may be an asymmetric construction about a longitudinal axis L in the forward direction 11 of the chassis in such an embodiment said rigid frame constitutes at least a part of an asymmetric construction about the longitudinal axis L. In one embodiment the rigid frame comprises two parts 1a and 1b which together form a basic asymmetric rigid frame of the chassis. The asymmetric shape enables an efficient implementation, in which the front and rear wheel and one of the side wheels are held together with a primary part 1a of the rigid frame and the secondary part 1b is connected to the other side wheel, preferably configured such that it can be tilted to let the side wheel climb an obstacle. The construction can also be used to provide improved shock absorption.

The fact that the front wheel and rear wheel are arranged to turn said front and rear wheels simultaneously and synchronously makes the steering and propulsion simple and efficient. Only one control signal is needed to the steering mechanisms since one turning mechanism 20 can be used to control the steering mechanism of both wheels, which are connected mechanically to the chassis, directly or indirectly.

As mentioned, in this configuration the energy that the motor(s) has/have to supply is only applied to propulsion directly in the moving direction. This is a more energy efficient solution, which means that a vehicle mounted on the chassis can be transported a longer distance on the same battery compared to a conventional chassis. If the front and rear wheels are positioned with the same distance from the axis of the parallel side wheels (side wheels positioned at equal longitudinal distance from the front wheel and rear wheel), the front and rear wheel have the same (but opposite) turning angles when the chassis turns. This makes the turning mechanism very simple and also implies that the front and rear wheels have the same speed when the chassis turns while driving. This is an advantage for the energy efficiency since if the rotation speed would have to be changed individually for the wheels when the driving direction changes it would imply unnecessary starting/stopping or acceleration/deceleration of the wheels. In one embodiment said chassis is directly or indirectly connected with at least one battery 22 for propulsion and electric functions to take advantage of the driving and energy improvements of the present invention. In one embodiment at least one of the wheels of said pair of side wheels is connected with or comprises an electric motor 24 which transforms supplied energy into rotation, which can be said to provide additional energy to move the vehicle forwards or backwards.

In one embodiment, the positions of the front wheel, rear wheel and side wheels, from an above perspective, form a rhombus. More precisely, the vertical axes of the four wheels, seen from above, form a rhombus. This configuration, in combination with propulsion from the front and/or rear the can be seen as a very efficient solution for turning the chassis since the front and rear wheel can be positioned 90° in relation to the parallel side wheels. The front and rear wheels can have the same rotation speed and the rhombic configuration makes the turning radius smaller compared to a solution with wheels in a square or rectangle configuration. If the front and rear wheel are positioned 90° in relation to the parallel side wheels the length of the chassis becomes shorter compared to when the front and rear wheel are positioned in the same direction as the parallel side wheels since the front and rear wheel are the outer limit in this embodiment. In one embodiment the sides of the rhombus have the same length.

One aspect of the present invention relates to the front wheel and/or rear wheel being able to rotate about an approximately vertical axis within the width of the wheel. In this configuration the forces on the steering mechanism of the wheel are distributed more symmetrically on the chassis from different turning positions. In one embodiment said rigid frame comprises a primary mechanism providing a direct or indirect physical coupling between the front wheel and said rigid frame. In one embodiment said rigid frame comprises a secondary mechanism providing direct or indirect physical coupling between the rear wheel and said rigid frame. In one embodiment said turning mechanism 20 therefore comprises gear wheels, rollers, tension rods, hydraulic hoses, hydraulic pistons, wires, cables, ropes and the like. The turning mechanism may be activated manually. In one embodiment the turning mechanism 20 is driven by a linear actuator, a servomotor, a hydraulic cylinder (32) or the like, which may further improve the turning capabilities.

A further advantage of the invention is that in one embodiment the rigid frame comprises at least two parts and in which at least two of these parts are hinged, preferably horizontally, relative to one another, configured such that the vertical position of the side wheels follows unevenness of a surface when the vehicle is moving on the surface. Such a design can be said to combine that advantages relating to turning the chassis with vertical flexibility. In one embodiment this is described as the chassis having a primary part connected with the front wheel, the rear wheel and one of the wheels of said pair of side wheels, and hinged with a secondary part, wherein the secondary part is connected with the other one of the side wheels, and hinged with the primary part. This is shown in e.g. FIG. 1. In one embodiment of such a solution comprises a shock absorber 26, thus making the primary part and secondary part shock absorbing and/or suspended relative to each other in order to further improve the comfort. A similar asymmetric is also possible, wherein the primary part is connected with said pair of side wheels and one of the front wheel and rear wheel and hinged to the secondary part, and wherein the secondary part is connected with the other one of the front wheel and rear wheel and hinged to the primary part.

To further control the driving speed of the chassis/vehicle at least one of said wheels is directly or indirectly coupled to a brake 28, such as a mechanical brake and/or an electric brake and/or a hydraulic brake in one embodiment of the invention. The chassis may also be equipped with at least one positioning device for displaceable and/or rotational positioning of at least one element with at least one degree of freedom to move relative to the driving frame or parts thereof, which can be said to improve the overall flexibility of the chassis.

Preferably, the primary part of the rigid frame (1a) is connected to the middle of front wheel and rear wheel from the substantially same horizontal plane. Alternatively expressed, the rigid frame and the centre of the wheels of the chassis are positional in substantially the same horizontal plane. In one embodiment both steerable wheels are coupled to the rigid frame from one and the same side through a steering mechanism contained in the perimeter of the wheel. Since the chassis is connected to the wheels from the sides the total height of the chassis is determined by the diameter of the wheels. There are several advantages associated with such a design. Reduced height means lower centre of mass. The design is also lighter than the chassis known in the art. In one embodiment the height of the chassis is therefore less than 100 cm, or less than 90 cm, or less than 80 cm, or less than 70 cm, or less than 60 cm, or less than 50 cm, or less than 40 cm, or less than 30 cm, or less than 25 cm, or less than 20 cm, or less than 15 cm, or less than 10 cm, such as 100 cm, or 90 cm, or 80 cm, or 70 cm, or 60 cm, or 50 cm, or 40 cm, or 38 cm, or 36 cm, or 34 cm, or 32 cm, or 30 cm, or 28 cm, or 26 cm, or 24 cm, or 22 cm, or 20 cm, or 18 cm, or 16 cm.

In one embodiment the length, i.e. the distance between the outer part of the front wheel and the outer part of the rear wheel, is between 50 cm and 800 cm, or between 50 cm and 500 cm, or between 50 and 300 cm, or between 40 cm and 200 cm, or between 20 cm and 100 cm, or between 30 cm and 90 cm, or between 40 cm and 100 cm, or between 50 cm and 100 cm, or between 50 cm and 90 cm, or between 60 cm and 100 cm, or between 60 cm and 90 cm, such as 20 cm, or 30 cm, or 35 cm, or 40 cm, or 45 cm, or 50 cm, or 60 cm, or 65 cm, or 70 cm, or 75 cm, or 80 cm, or 85 cm, or 90 cm, or 95 cm, or 100 cm, or 200 cm, or 300 cm, or 400 cm, or 500 cm, or 600 cm, or 700 cm, or 800 cm.

In one embodiment the width, i.e. the distance between the outer part of the left side wheel and the outer part of the right side wheel, is between 50 and 300 cm, or between 40 cm and 200 cm, or between 20 cm and 100 cm, or between 30 cm and 90 cm, or between 40 cm and 100 cm, or between 50 cm and 100 cm, or between 50 cm and 90 cm, or between 60 cm and 100 cm, or between 60 cm and 90 cm, such as 20 cm, or 30 cm, or 35 cm, or 40 cm, or 45 cm, or 50 cm, or 60 cm, or 65 cm, or 70 cm, or 75 cm, or 80 cm, or 85 cm, or 90 cm, or 95 cm, or 100 cm, or 200 cm, or 300 cm.

Electrically driven wheelchairs are relatively heavy vehicles which is due to several interconnected factors: firstly, the very construction with heavy special seats and special functions generates a high weight of 100-175 kg; secondly, the manner in which conventional electrically driven wheelchairs are steered by means of changing rotation speed of the driving wheels gives rise to a large energy consumption and loss since relatively larges forces are required to drive such an electrically driven wheelchair; thirdly, large motors and batteries are required because of the weight which also contributes to the total relatively high weight of the electrically driven wheelchair; fourthly, electrically driven wheelchairs are built for a full day's drive with possible climbing of obstacles and elevations which has also made these types relatively heavy, and the weight of the batteries in connection with the above is considerable and often constitutes about 40 kg. Conventional wheelchairs require a lot of manoeuvring space with respect to existing buildings and set requirements for door widths. They typically require a ramp in order to be able to get into buildings as even one single stair is normally higher than 7 cm. Therefore the present disclosure further relates to a wheelchair 30 comprising the chassis according to the above description and the figures.

Besides wheelchairs, the chassis can be used for a range of vehicles. Therefore the present invention further relates to a vehicle configured to transport humans, animals, goods or equipment. In one embodiment the chassis is configured for use as transportation of a person such as, an electric wheelchair, an automobile, a four-wheel moped/scooter/motorcycle or the like. In another embodiment the chassis is configured for use in a vehicle for use for transportation of goods such as, foodstuffs, medicine and safety equipment, or in an electric lorry. The chassis may also be used in a vehicle for use as an exploration tool such as a radio controlled inspection vehicle for investigation of sewers or collapsed buildings, a self-propelled drone or the like or as a manned or unmanned military vehicle.

FIG. 1 shows an embodiment of a chassis according to the present invention, seen from above, in which the chassis comprises the following parts: a primary part 1a of the rigid frame, hinged to a secondary part 1b, wherein these two parts 1a and 1b together form a basic asymmetric rigid frame of the chassis seen from above. Direction 11 represents a forward driving direction of the chassis. Front wheel 2 is connected to a front wheel electric motor 3 and a forward front wheel steering mechanism 8. These parts are connected to primary part 1a of the rigid frame. Primary part 1a is connected to the middle of front wheel 2 from the substantially same horizontal plane. Front wheel 2 can turn around a vertical axis located within the periphery of front wheel 2. Of physical part of said axis connects front wheel 2, the electric motor 3 and steering mechanism 8 to the primary part 1a. The rear part has the same construction, including rear wheel 4, rear wheel electric motor 5 and rear wheel steering mechanism 9. Left side wheel 6 is connected to primary part 1a of the rigid frame. Right side wheel 7 is connected to a secondary part 1b of the rigid frame, which is connected to the primary part 1a. The reference 10 represents the distances between the centres of the wheels. In this embodiment the distance from the centre of front wheel 2 to the centre of left side wheel 6 and right side wheel 7 is the same, and this distance is also the same as the distance from the middle of rear wheel 4 to the middle of left side wheel 6 and right side wheel 7.

Figure 2:
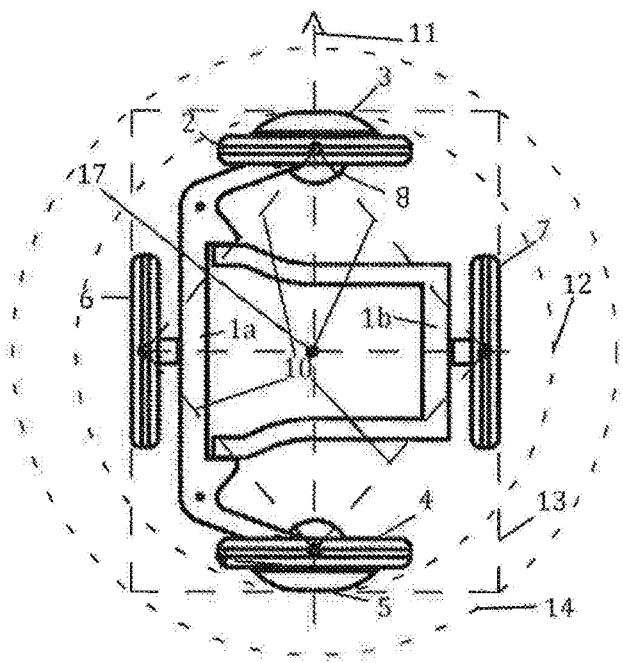
FIG. 2 shows an embodiment of a chassis according to the invention, seen from above, with the wheels in a turning position.

FIG. 2 shows an embodiment of a chassis according to the present invention, seen from above as indicated in FIG. 1. Front wheel 2 and rear wheel 4 are synchronously turned so that the chassis, rotates around the centre 17 of the construction when driven. Furthermore, this embodiment shows the difference in the space required to turn around the centre 17 of the construction for the presently disclosed invention.

Turning circle 12 indicates the needed space for the chassis according to the present invention. Circle 14 indicates the space needed for a conventional chassis 13 having wheels in all four corners.

Figure 3:
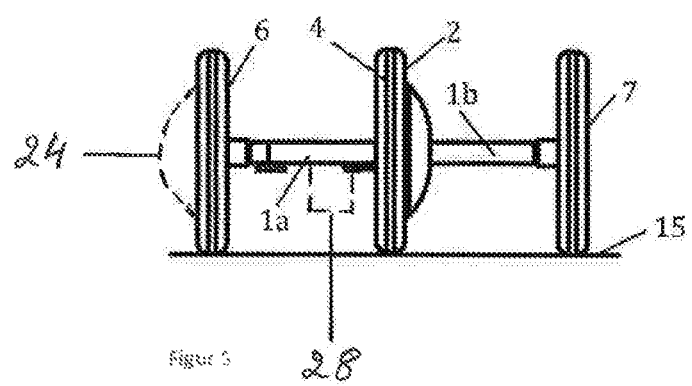
FIG. 3 shows an embodiment of a chassis according to the invention, seen from above, with the wheels in a position for turning around a point corresponding to the pressure surface of the right side wheel against the surface.

FIG. 3 shows an embodiment of a chassis according to the present invention, seen from above as indicated in FIG. 1, but in which front wheel 2 and rear wheel 4 are synchronously turned at an angle α and an angle β, respectively, and in which these—with respect to the steering synchronicity of the invention—have the same size but are opposite. When electric motors 3 and 5 are activated, i.e. configured to move front wheel 2 and rear wheel 4 forwards, the chassis rotates about a vertical axis corresponding to the pressure surface (against the ground) of right side wheel 7.

Figure 4:
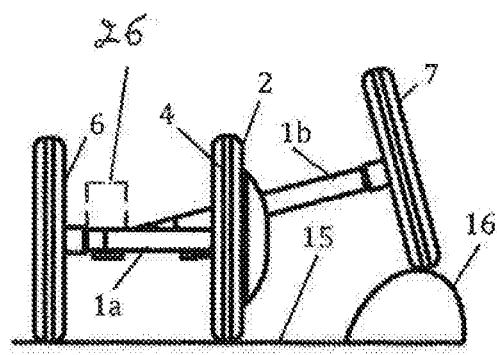
FIG. 4 shows an embodiment of a chassis according to the invention, seen from the side.

FIG. 4 shows an embodiment of a chassis according to the invention, seen from the side. In this embodiment the rigid frame and the centre of the wheels of the chassis are positional in substantially the same horizontal plane.

FIG. 5 shows an embodiment of a chassis according to the invention, seen from behind, showing the construction on an even surface 15.

FIG. 6 shows an embodiment of a chassis according to the invention, seen from behind, in which the wheels 2, 4 and 6 stand/drive on an even surface 15 and right side wheel 7 is climbing an obstacle 16. Secondary part 1b (and thereby side wheel 7) is vertically tiltable in relation to the primary part wheel 1a and the rest of the chassis. Primary part 1a is hinged with secondary part 1b. FIG. 6 in combination with FIG. 1 shows how such a construction can be achieved.

The invention claimed is:

1. A chassis for a vehicle, comprising:
   a rigid frame;
   a pair of side wheels in a parallel configuration, each side wheel having an axle;
   a steerable front wheel having an axle;
   a steerable rear wheel having an axle;
   at least one electric motor, at least one of the steerable front wheel or ear wheel being connected to and driven by the at least one electric motor; and
   a turning mechanism, the steerable front and rear wheels being mutually connected through the turning mechanism so as to turn the front and rear wheels simultaneously and synchronously between:
   a middle position in which the axles of the front and rear wheels are substantially parallel with the axles of the side wheels, and
   left or right end positions, in which the axles of the front and rear wheels are substantially perpendicular to the axles of the side wheels; and
      the rigid frame and the axles of the wheels of the chassis being disposed in substantially one horizontal plane, wherein the rigid frame constitutes at least two parts, both of the at least two frame parts having an asymmetric construction about a longitudinal axis.

2. The chassis for a vehicle according to claim 1, wherein the at least one electric motor comprises a primary electric motor and a secondary motor, the rear wheel being connected to and driven by the primary, electric motor, and the front wheel being connected to and driven by the secondary electric motor.

3. The chassis for a vehicle according to claim 1, wherein at least one of the side wheels is tiltable relative to the horizontal plane.

4. The chassis for a vehicle according to claim 1, wherein the steerable front wheel is configured to rotate on an approximately vertical axis within a width of the front wheel and the steerable rear wheel is configured to rotate on an approximately vertical axis within a width of the rear wheel.

5. The chassis for a vehicle according to claim 1, wherein the rigid frame comprises:
   a primary mechanism providing a direct or indirect physical coupling between the front wheel and the rigid frame; and
   a secondary mechanism providing a direct or indirect physical coupling between the rear wheel and the rigid frame.

6. The chassis for a vehicle according to claim 1, wherein the chassis is directly or indirectly connected with at least one battery for propulsion and electric functions.

7. The chassis liar a vehicle according to claim 1, wherein:
   at least one of the pair of side wheels is connected with or comprises a further electric motor which transforms supplied energy into rotation.

8. The chassis for a vehicle according to claim 1, wherein the the turning mechanism includes at least one or more components from a group consisting of gear wheels, rollers, tension rods, hydraulic hoses, hydraulic pistons, wires, cables, and ropes.

9. The chassis for a vehicle according to claim 1, wherein said turning mechanism is activated manually or said turning mechanism is driven by at least one or more components from a group consisting of one linear actuator, a servomotor, a hydraulic and a cylinder.

10. The chassis for a vehicle according to claim 1, wherein the chassis is configured for use as transportation of a person or configured for use in a vehicle for use for transportation of goods or configured for use in a vehicle for use as an exploration tool as a radio controlled inspection vehicle for investigation of sewers or collapsed buildings, or a self propelled drone or configured to be used as part of a military vehicle, and wherein the vehicle is manned or unmanned.

11. The chassis for a vehicle according to claim 1, wherein the side wheels, front wheel and rear wheel form a rhombus.

12. The chassis for a vehicle according to claim 1, wherein the side wheels are each positioned at an equal longitudinal distance from the front wheel and rear wheel.

13. The chassis for a vehicle according to claim 1, wherein at least one of said wheels is directly or indirectly coupled to a brake.

14. The chassis for a vehicle according to claim 1, wherein the chassis is connected to at least one positioning device for displaceable and/or rotational positioning of at least one element with at least one degree of freedom to move relative to the frame or parts thereof.

15. A vehicle comprising the chassis according claim 1.

16. The vehicle according to claim 15, wherein the vehicle is configured to transport humans, animals, goods or equipment.

17. A wheelchair comprising the chassis according claim 1.

18. The chassis for a vehicle according to claim 1, wherein each side wheel is fixed in a forward facing direction.

19. A chassis for a vehicle, comprising:
a rigid frame having at least two parts hinged horizontally relative to one another, the at least two parts includes a primary part and a secondary part;
a pair of side wheels in a parallel configuration, each side wheel having an axle;
a steerable front wheel having an axle;
a steerable rear wheel having an axle;
at least one electric motor, at least one of the steerable front wheel or rear wheel being connected to and driven by the at least one electric motor; and
a turning mechanism, the steerable front and rear wheels being mutually connected through the turning mechanism so as to turn the front and rear wheels simultaneously and synchronously between:
a middle position in which the axles of the front and rear wheels are substantially parallel with the axles of the side wheels, and
left or right end positions, in which the axles of the front and rear wheels are substantially perpendicular to the axles of the side wheels;
and wherein the rigid frame and the axles of the wheels of the chassis are disposed in substantially one horizontal plane, the rigid frame configured such that the vertical position of the side wheels follows unevenness of a surface when the vehicle is moving on the surface, the primary part being connected with the front wheel, the rear wheel, and one of the pair of side wheel and hinged to the secondary part, and the secondary part being connected the other one of the side wheels hinged to the primary part.

20. The chassis for a vehicle according to claim 19, wherein the primary part and secondary part are shock absorbing and/or suspended relative to each other.

21. A chassis for a vehicle, comprising:
a rigid frame, the rigid frame having at least two parts hinged horizontally relative to one another;
a pair of side wheels a parallel configuration, each side wheel having an axle;
a steerable front wheel having an axle;
a steerable rear wheel having an axle;
the at least two parts having a primary part and a secondary part;
the primary part being connected with the front wheel, the rear wheel, and one of the pair of side wheels and hinged to the secondary part;
the secondary part being connected with the other one of the side wheels, and hinged to the primary part;
at least one electric motor, at least one of the steerable front wheel or rear wheel being connected to and driven by the at least one electric motor; and
a turning mechanism, the steerable front and rear wheels being mutually connected through the turning mechanism so as to turn the front and rear eels simultaneously and synchronously between;
a middle position in which the axles of the front and rear wheels are substantially parallel with the axles of the side wheels, and
left or right end positions, in which the axles of the front and rear wheels are substantially perpendicular to the axles of the side wheels; and
the rigid frame and the axles of the wheels of the chassis being disposed in substantially one horizontal plane.

* * * * *